(12) United States Patent
Kato et al.

(10) Patent No.: US 6,439,708 B1
(45) Date of Patent: Aug. 27, 2002

(54) METHOD OF INK-JET RECORDING WITH TWO FLUIDS

(75) Inventors: Shinichi Kato; Toshiyuki Miyabayashi, both of Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/509,389

(22) PCT Filed: Jul. 27, 1999

(86) PCT No.: PCT/JP99/04023

§ 371 (c)(1),
(2), (4) Date: Mar. 24, 2000

(87) PCT Pub. No.: WO00/06390

PCT Pub. Date: Feb. 10, 2000

(30) Foreign Application Priority Data

Jul. 27, 1998 (JP) ............................................. 10-211296

(51) Int. Cl.⁷ ................................................. B41J 2/17
(52) U.S. Cl. ............................ 347/98; 347/100; 347/96
(58) Field of Search ............................... 347/100, 96, 98

(56) References Cited

U.S. PATENT DOCUMENTS 5,549,740 A * 8/1996 Takahashi et al. .......... 347/100
5,618,338 A * 4/1997 Kurabayashi et al. ....... 347/100
5,792,249 A * 8/1998 Shirota et al. .............. 347/100

FOREIGN PATENT DOCUMENTS

| EP | 0726158 | 8/1996 | |
| EP | 0739743 | 10/1996 | |
| JP | 04021446 | * 1/1992 | ............. B41J/2/01 |
| JP | 8295034 | 11/1996 | |
| JP | 10338830 | 12/1998 | |

OTHER PUBLICATIONS

Patent Abstracts of Japan Publication No. 10338830 dated Dec. 22, 1998.

* cited by examiner

Primary Examiner—John Barlow
Assistant Examiner—M Shah
(74) Attorney, Agent, or Firm—Ladas & Parry

(57) ABSTRACT

Disclosed are an ink jet recording method, which can produce, on recording media, good images possessing good lightfastness, waterfastness, rubbing resistance/scratch resistance, and gloss, and a reaction solution and an ink composition for use in the ink jet recording method. After printing of an ink composition, the application of a first liquid to form a coating can improve the waterfastness, rubbing resistance/scratch resistance and gloss of records. The incorporation of a cationic emulsion containing sites possessing ultraviolet absorbing activity and/or photostabilizing activity into the reaction solution can improve the lightfastness of records.

36 Claims, 5 Drawing Sheets

METHOD OF INK-JET RECORDING WITH TWO FLUIDS

BACKGROUND OF THE INVENTION

1. Field of the Invention

The present invention relates to an ink jet recording method using two liquids, wherein an ink composition and at least one additional liquid are deposited onto a recording medium to perform printing.

2. Background Art

Ink jet recording is a printing method wherein droplets of an ink composition are ejected and deposited onto a recording medium, such as paper, to perform printing. This printing method is advantageous in that a high-resolution, high-quality image can be printed at a high speed using relatively inexpensive apparatuses. In general, the ink composition used in the ink jet recording comprises water as a main component and, added thereto, a colorant and a wetting agent, such as glycerin, for preventing clogging and other purposes.

On the other hand, regarding the ink jet recording method, the application of a polyvalent metal salt solution onto a recording medium followed by the application of an ink composition containing a dye having at least one carboxyl group has been recently proposed (for example, Japanese Patent Laid-Open No. 202328/1993). The claimed advantage of this method is that the polyvalent metal ion combines with the dye to form an insoluble complex, the presence of which can offer an image having waterfastness and high quality free from color bleeding.

Further, the use of a color ink comprising at least a penetrating property-imparting surfactant, or at least a solvent having a penetrating property and a salt, in combination with a black ink capable of being thickened or coagulated through the action of the salt has been proposed in the art (Japanese Patent Laid-Open No. 106735/1994). The claimed advantage of this method is that high-quality color images having high image density and free from color bleeding can be yielded. Specifically, an ink jet recording method capable of realizing good images has been proposed wherein two liquids, a first liquid containing a salt and an ink composition, are printed.

Other ink jet recording methods, wherein two liquids are printed, have also been proposed, for example, in Japanese Patent Laid-Open Nos. 240557/1991 and 240558/1991.

In recent years, color ink jet recording apparatuses for ink jet recording, capable of realizing improved image quality, have become used as an output device for photographs and also as a digital printer, a plotter, a CAD output device and the like. Images printed by means of color ink jet recording apparatuses, which have become widely used in the art, are considered utilizable in various forms. In particular, for photograph-like prints, gloss is required of images in order to enhance the texture. Further, high lightfastness is also required, because they are in many cases put for display in a place exposed to light emitted from a fluorescent lamp or direct sunlight in the open for a long period of time. Selecting a colorant having relatively good lightfastness or improving the lightfastness of the colorant per se is carried out as means particularly for improving the lightfastness. In many cases, however, it is difficult to simultaneously satisfy desired color tone and lightfastness. The addition of a commercially available ultraviolet absorber or a photostabilizer to the ink composition or the second liquid is considered effective for solving this problem. Since, however, most of the ultraviolet absorbers and the photostabilizers are oil soluble, the presence thereof in a satisfactory amount in the water-soluble ink composition is difficult.

Furthermore, in consideration of applications of records printed by the ink jet recording method and environments, under which the prints are used, the records desirably possess excellent waterfastness and rubbing/scratch resistance.

In addition, also for prints other than the photograph-like prints, in order to impart excellent aesthetic effect to records, there is an ever-increasing demand for better gloss.

SUMMARY OF THE INVENTION

The present inventors have now found that, in an ink jet recording method using two liquids, the deposition of an ink composition onto a recording medium followed by the deposition of a first liquid containing polymeric fine particles can improve the waterfastness, rubbing/scratch resistance and/or gloss of records.

Accordingly, it is an object of the present invention to provide an ink jet recording method which can realize printed images possessing excellent waterfastness, rubbing/scratch resistance, gloss, and lightfastness.

According to one aspect of the present invention, there is provided an ink jet recording method comprising the step of depositing an ink composition and a first liquid containing at least polymeric fine particles onto a recording medium to perform printing, wherein the ink composition is deposited onto the recording medium and, thereafter, the first liquid is deposited onto the recording medium in its position where the ink composition has been deposited.

DETAILED DESCRIPTION OF THE INVENTION

Ink Jet Recording Method

Figure 1:
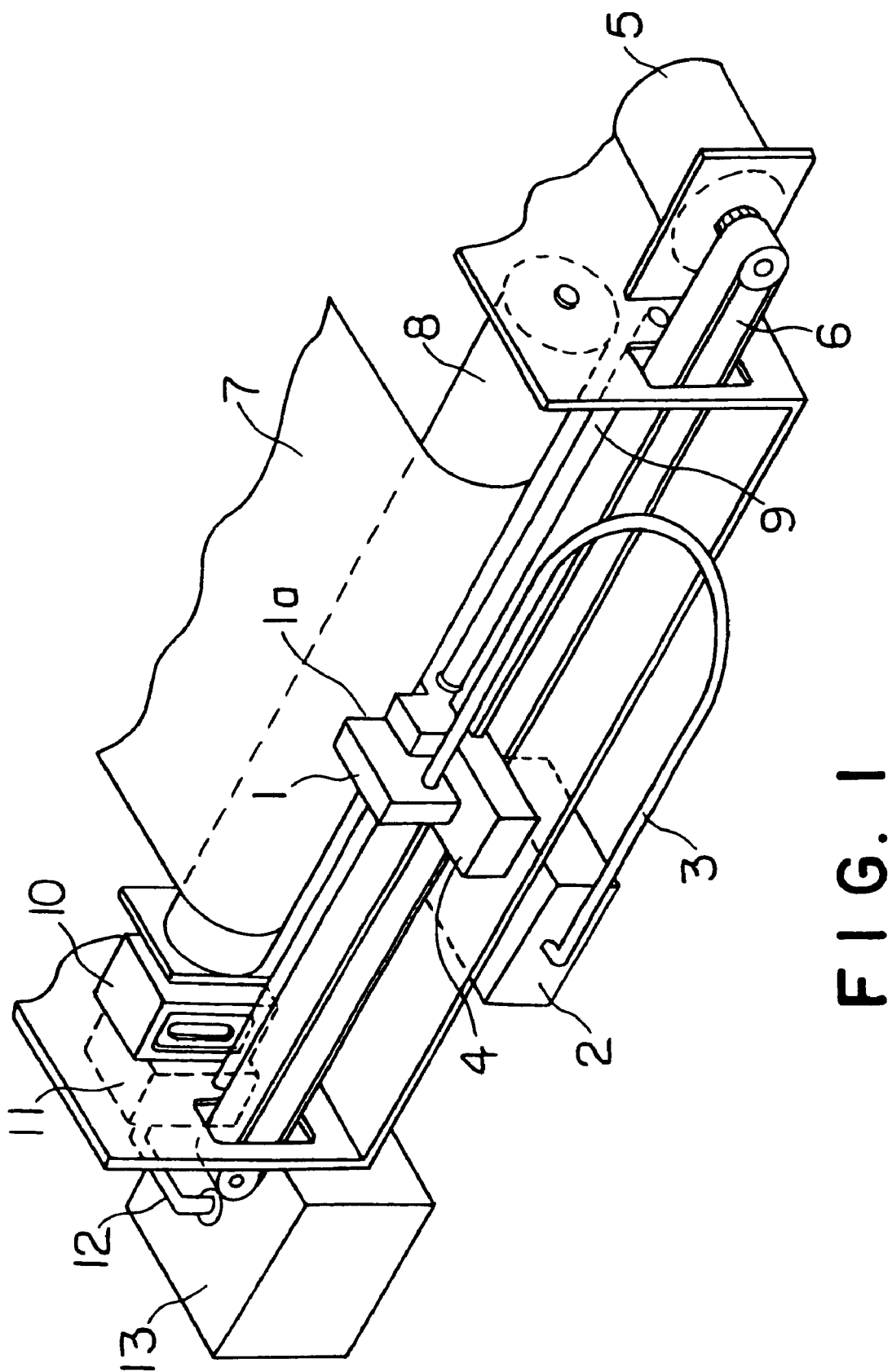
FIG. 1 is a diagram showing an ink jet recording apparatus preferably usable in practicing the ink jet recording method according to the present invention, wherein a recording head is provided separately from an ink tank to feed an ink composition and a first liquid into a recording head through an ink tube.

The ink jet recording method according to the present invention comprises the step of depositing an ink composition onto a recording medium; and, thereafter, depositing a first liquid containing at least polymeric fine particles onto the recording medium in its position where the ink composition has been deposited.

According to the present invention, it is considered that covering of pixels, yielded by the ink compositions, with polymeric fine particles contained in the first liquid can improve the rubbing/scratch resistance, waterfastness, gloss, and lightfastness of records produced by ink jet recording on recording media. In particular, when the first liquid contains polymeric fine particles having a film-forming property, upon the deposition of the first liquid onto the ink composition deposited onto the recording medium, the polymeric fine particles contained in the first liquid covers the deposited ink composition. Further, in this case, the polymeric fine particles coalesce with and are fused to one another to form a film. Consequently, the ink composition deposited onto the recording medium is covered with this film. This is considered to provide more significant effect in terms of waterfastness and the like.

According to a preferred embodiment of the present invention, the first liquid is deposited after the deposition of the ink composition. Alternatively, the first liquid may be deposited onto the recording medium both before and after the deposition of the ink composition. When the first liquid is deposited both before and after the deposition of the ink composition, the rubbing/scratch resistance, waterfastness, gloss, and lightfastness of records can be further improved.

So far as the first liquid is deposited onto an area where the ink composition has been deposited, the deposition of the first liquid onto the recording medium may be carried out by any of a method wherein the first liquid is selectively deposited onto only an area where the ink composition is deposited, and a method wherein the first liquid is deposited on the whole area of the paper. The former method is cost-effective because the consumption of the first liquid can be minimized. In this method, however, the accuracy of the position at which both the first liquid and the ink composition are deposited should be high to some extent. On the other hand, in the latter method, as compared with the former method, the requirement for the accuracy of the position where the first liquid and the ink composition are deposited is relaxed. In the latter method, however, a larger amount of the first liquid should be deposited on the whole area of the paper. This is likely to create curling of the paper at the time of drying. For this reason, the method used may be determined by taking a combination of the ink composition with the first liquid into consideration.

According to a preferred embodiment of the present invention, so far as the first liquid is deposited onto the recording medium after the deposition of the ink composition, the ink jet recording method may further comprise the step of depositing a second liquid containing a reactant, which forms coagulate upon contact with the ink composition, onto the recording medium, separately before or after the deposition of the ink composition or the first liquid. The second liquid containing the reactant may be provided separately from the first liquid. Alternatively, the first liquid further contains the reactant.

The second liquid and the ink composition may be applied onto a recording medium in any sequence. Specifically, any of the following methods may be suitably used: a method wherein the second liquid is first deposited onto a recording medium followed by deposition of the ink composition onto the recording medium with the second liquid deposited thereon; a method wherein the ink composition is first printed followed by deposition of the second liquid; and a method wherein the second liquid and the ink composition are mixed together immediately before or immediately after ejection thereof. According to a preferred embodiment of the present invention, the step of depositing the reactant is carried out before the step of depositing the ink composition onto the recording medium.

In the ink jet recording method according to the present invention, the contact of the second liquid with the ink composition can realize good prints. Although the present invention is not intended to be bound by the following hypothesis, the reason why good printing can be achieved by the contact of the second liquid with the ink composition is believed as follows. Upon contact of the second liquid with the ink composition, a polyallylamine, a polyallylamine derivative, or a polyvalent metal salt contained in the second liquid breaks the state of dispersion of a colorant and other ingredients contained in the ink composition, resulting in coagulation of these ingredients. The resultant coagulate is considered to inhibit the penetration of the colorant into the recording medium. It is considered that this results in the deposition of the colorant onto the recording medium and in the formation of prints having high color density and free from feathering and uneven printing. Further, in color images, uneven color mixing in boundaries of different colors, that is, color bleeding, can also be advantageously prevented.

The deposition of the second liquid onto the recording medium may be carried out by any of a method wherein the second liquid is selectively deposited onto only an area where the ink composition is deposited, and a method wherein the second liquid is deposited on the whole area of the paper. The former method is cost-effective because the consumption of the second liquid can be minimized. In this method, however, the accuracy of the position at which both the second liquid and the ink composition are deposited should be high to some extent. On the other hand, in the latter method, as compared with the former method, the requirement for the accuracy of the position where the second liquid and the ink composition are deposited is relaxed. In the latter method, however, a larger amount of the second liquid should be deposited on the whole area of the paper. This is likely to create curling of the paper at the time of drying. For this reason, the method to be used may be determined by taking a combination of the ink composition with the second liquid into consideration. When the former method is adopted, the second liquid may be deposited by ink jet recording.

In the ink jet recording method according to one preferred embodiment of the present invention, the deposition of the ink composition and the first liquid onto the recording medium is carried out by means of an ink jet recording head, which is reciprocated above the recording medium, and the ink composition and the first liquid are deposited during either the movement of the ink jet recording head in the forward or backward direction.

In the ink jet recording method according to another preferred embodiment of the present invention, the deposition of the ink composition and the first liquid onto the recording medium is carried out by means of an ink jet recording head, which is reciprocated above the recording medium, and the ink composition and the first liquid are deposited during both the movement of the ink jet recording head in the forward and backward directions.

The second liquid may contain a colorant and function as an ink composition.

First liquid

The first liquid used in the present invention contains at least polymeric fine particles. Upon the deposition of the first liquid on pixels yielded by the ink compositions deposited onto a recording medium, the pixels are covered with the polymeric fine particles. This is considered to realize excellent waterfastness, rubbing/scratch resistance and/or gloss.

According to a preferred embodiment of the present invention, the polymeric fine particles have a film-forming property. In connection with the polymeric fine particles, the expression "having a film-forming property" means that, when the polymeric fine particles are held at the minimum film-forming temperature or above, the fine particles can coalesce with and can be fused to one another to form a film of the polymeric fine particles. According to a further preferred embodiment of the present invention, the minimum film-forming temperature of the polymeric fine particles is room temperature or below, preferably 30° C. or below, for example, 0° C. or below. As soon as the first liquid containing polymeric fine particles having the above minimum film-forming temperature is deposited onto a recording medium, the polymeric fine particles form a film on the recording medium at room temperature.

According to another preferred embodiment of the present invention, the minimum film-forming temperature of the polymeric fine particles is 150° C. or below, more preferably 90° C. or below. According to this preferred embodiment, the deposition of the first liquid containing polymeric fine particles onto a recording medium as such does not immediately result in the formation of a film, and, upon heating of the deposited first liquid by means of heating means provided in an ink jet recording apparatus to raise the temperature of the recording medium to the minimum film-forming temperature or above, a film of the polymeric fine particles is formed.

According to a preferred embodiment of the present invention, the polymeric fine particles are added in the form of a resin emulsion containing water as a continuous phase.

Examples of polymeric fine particles usable herein include fine particles of acrylic resin, vinyl acetate resin, styrene-butadiene resin, vinyl chloride resin, acryl-styrene resin, butadiene resin, styrene resin, crosslinked acrylic resin, crosslinked styrene resin, benzoguanamine resin, phenolic resin, silicone resin, and epoxy resin.

According to a preferred embodiment of the present invention, the polymer constituting the polymeric fine particles has a combination of a hydrophilic segment with a hydrophobic segment. The particle diameter of the polymeric fine particles is preferably not more than about 150 nm, more preferably about 5 to 100 nm.

These polymeric fine particles may be generally prepared as a resin emulsion by emulsion polymerization of a monomer in water in the presence of a surfactant and a water-soluble polymerization initiator. For example, an emulsion of an acrylic resin or a styrene-acryl resin may be prepared by emulsion polymerization of a (meth)acrylic ester, or alternatively a (meth)acrylic ester in combination with styrene, in the presence of a surfactant and a water-soluble polymerization initiator.

Conventional resin emulsions may also be used as the above resin emulsion. For example, resin emulsions described in Japanese Patent Publication No. 1426/1987 and Japanese Patent Laid-Open Nos. 56573/1991, 79678/1991, 160068/1991, and 18462/1992 as such may be used as the resin emulsion in the present invention.

Further, commercially available resin emulsions may also be used, and examples thereof include Microgel E-10002 and E-5002 (styrene/acrylic resin emulsion, manufactured by Nippon Paint Co., Ltd.), Voncoat 4001 (acrylic resin emulsion, manufactured by Dainippon Ink and Chemicals, Inc.), Voncoat 5454 (styrene/acrylic resin emulsion, manufactured by Dainippon Ink and Chemicals, Inc.), SAE-1014 (styrene/acrylic resin emulsion, manufactured by Nippon Zeon Co., Ltd.), and Saivinol SK-200 (acrylic resin emulsion, manufactured by Saiden Chemical Industry Co., Ltd).

The amount of the resin emulsion contained in the ink composition used in the present invention is preferably such that the amount of the resin component is in the range of from 0.1 to 40% by weight, more preferably in the range of from 1 to 25% by weight, based on the ink composition.

According to another preferred embodiment of the present invention, the polymeric fine particles are those containing cationic groups having sites possessing ultraviolet absorbing activity and/or photostabilizing activity.

According to a preferred embodiment of the present invention, the polymeric fine particles have absorption in the wavelength range of 200 to 400 nm, that is, in an ultraviolet region. Further, according to a preferred embodiment of the present invention, the polymeric fine particles containing cationic groups have, in the structure thereof, sites possessing ultraviolet absorbing activity and/or photostabilizing activity.

Further, according to a preferred embodiment of the present invention, the site possessing ultraviolet absorbing activity and/or photostabilizing activity is selected from the group consisting of aromatic monocyclic hydrocarbon groups, fused polycyclic aromatic hydrocarbon groups, heteromonocyclic groups, and fused heterocyclic groups.

Examples of sites possessing ultraviolet absorbing activity usable in this embodiment include those having benzophenone, benzotriazole, hindered phenol, salicylate, and cyanoacrylate skeletons. Examples of sites possessing photostabilizing activity include hindered amine skeletons.

Specific structures of these skeletons are as follows.

Benzophenone Skeleton

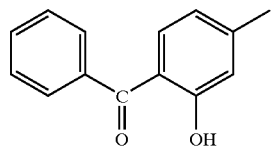

Benzotriazole Skeleton

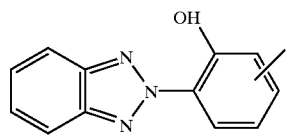

Hindered Phenol Skeleton

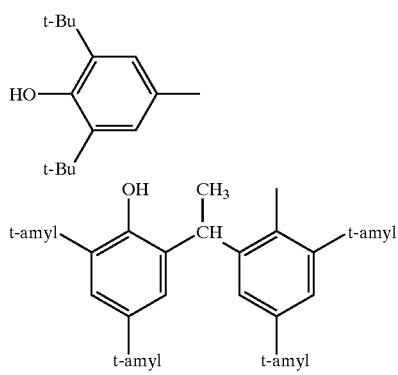

Salicylate Skeleton

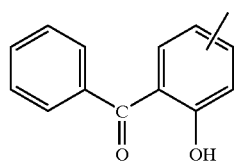

Cyanoacrylate Skeleton

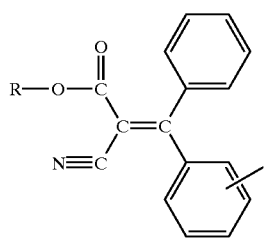

Hindered Amine Skeleton

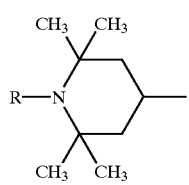

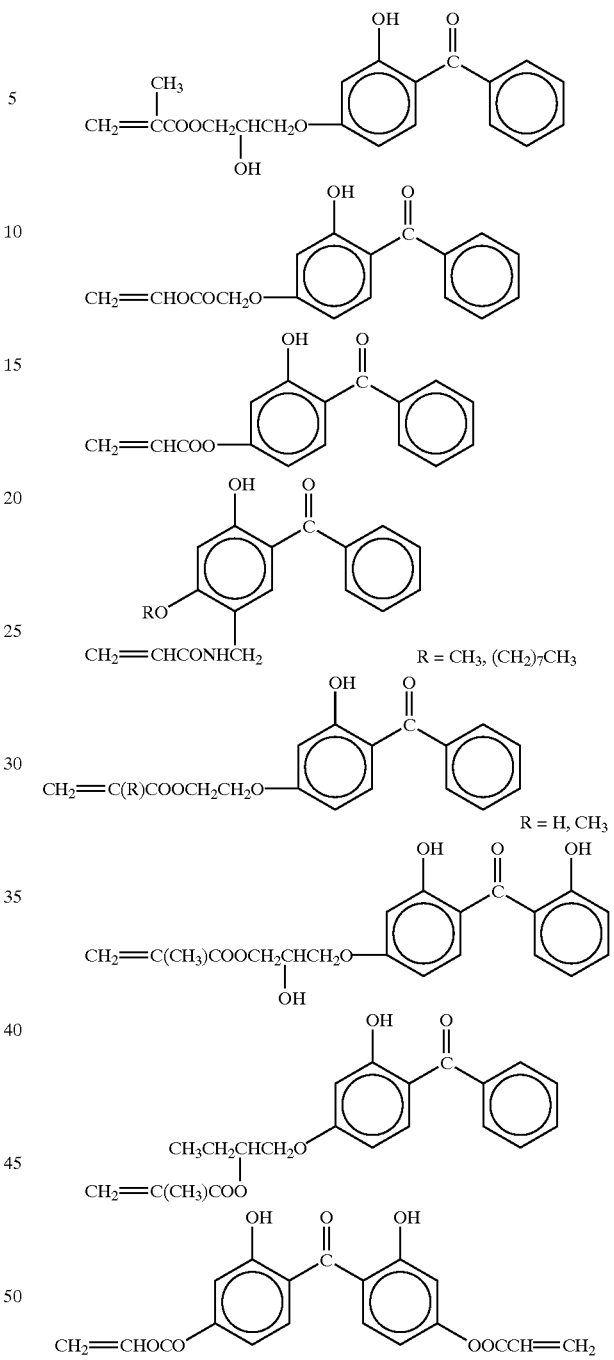

Specific examples of monomers containing sites possessing ultraviolet absorbing activity and/or photostabilizing activity include monomers containing the above site possessing ultraviolet absorbing activity and/or photostabilizing activity, and having an ethylenically unsaturated group, such as a methacryloyl, acryloyl, vinyl, or allyl group.

Specific examples of such monomers are as follows. At the outset, the following monomers may be mentioned as specific examples of monomers having an ultraviolet absorbing site with a benzophenone skeleton:

Specific examples of monomers having ultraviolet absorbing activity with a benzotriazole skeleton are as follows:

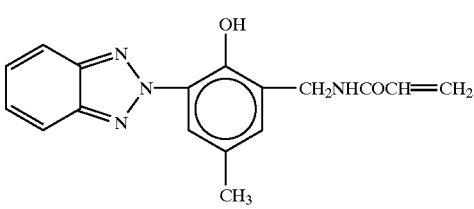

-continued
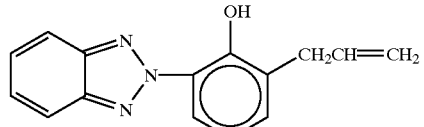
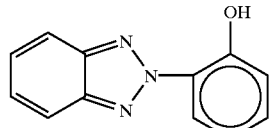
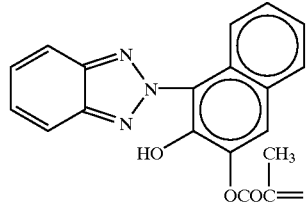
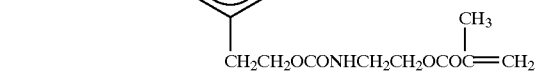
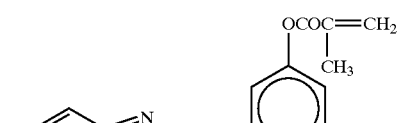
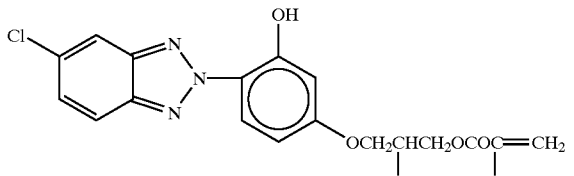
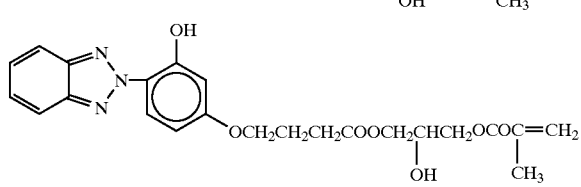
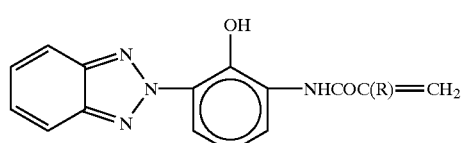
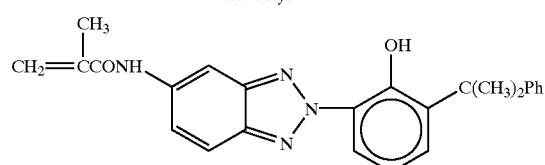
-continued
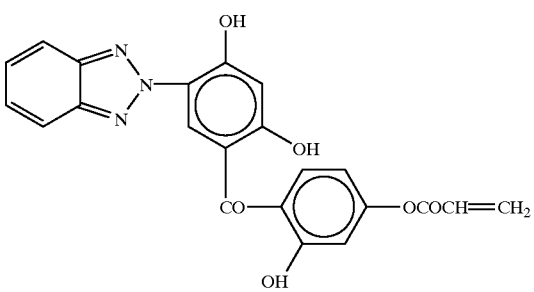
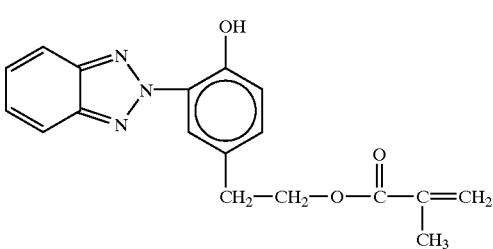
Specific examples of monomers having ultraviolet absorbing activity with a hindered phenol skeleton are as follows:
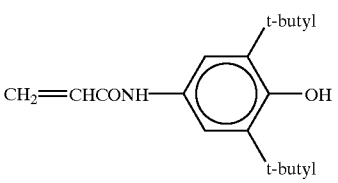
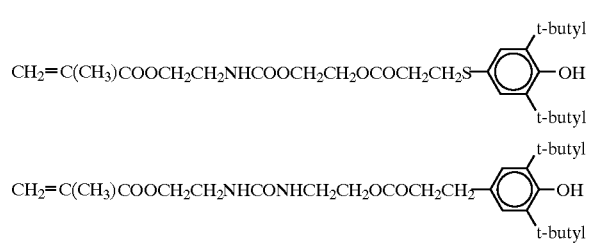
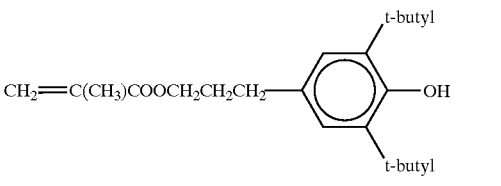
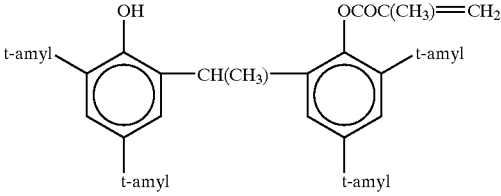
Specific examples of monomers having a photostabilizing site with a hindered amine skeleton are as follows:

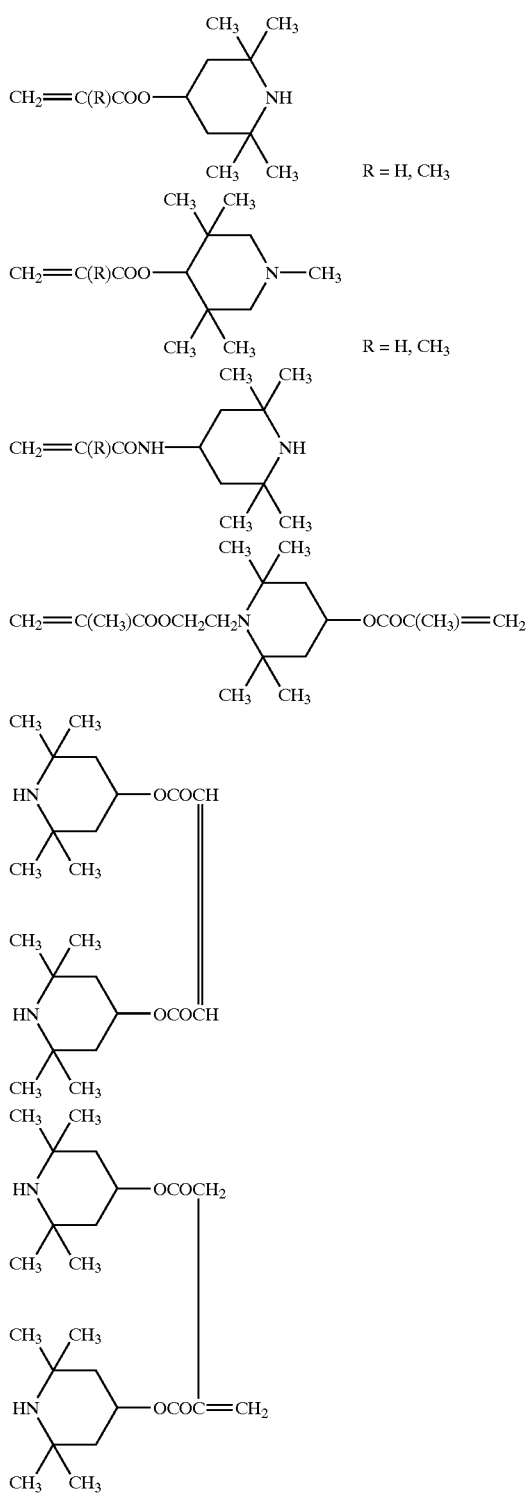

Monomers having sites possessing ultraviolet absorbing activity and/or photostabilizing activity may be commercially available ones. Examples thereof include: RUVA-93 (2-(2'-hydroxy-5-methylacryloxyethylphenyl)-2H-benzotriazole), available from Otsuka Chemical Co., Ltd., as the monomer having an ultraviolet absorbing site with a benzotriazole skeleton; and ADK STAB LA-82 (1,2,2,6,6-pentamethyl-4-piperidyl methacrylate) and ADK STAB LA-87 (2,2,6,6-tetramethyl-4-piperidyl methacrylate), available from Asahi Denka Kogyo Ltd., as the monomer having a photostabilizing site with a hindered amine skeleton.

The polymeric fine particles containing cationic groups usable in the present invention may be prepared by conventional radical emulsion polymerization. Specifically, the polymeric fine particles may be prepared by emulsion copolymerization of at least a monomer containing sites having ultraviolet absorbing activity and/or photostabilizing activity, a cationic group-containing monomer, and a cationic emulsifier in water in the presence of a water-soluble, radical polymerization initiator.

Cationic group-containing monomers usable in the present invention include, for example, unsaturated amines, such as dimethylaminoethyl methacrylate, allylamine, vinylpyridine, and vinylquinoline, and salts or alkylation quaternized derivatives thereof.

Specific examples of cationic emulsifiers usable in the present invention are as follows:

[R—N$^+$R'$_3$]X$^-$

[R—N$^+$R'$_2$—CH$_2$Ph]X$^-$

[R—N$^+$C$_5$H$_5$]X$^-$

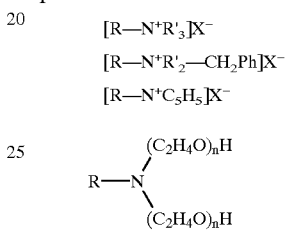

wherein R represents a higher alkyl group, such as lauryl or stearyl; R' represents a lower alkyl group; and X represents Cl, R'—OSO$_3$ or the like.

In addition to the polymeric fine particles described above, polymeric fine particles described below in connection with the ink composition may also be mentioned as examples of the polymeric fine particles usable in the present invention. These polymeric fine particles will be described below in detail in connection with the ink composition.

According to a preferred embodiment of the present invention, the first liquid contains a water-soluble organic solvent in addition to the resin emulsion. Any water-soluble organic solvent may be used so far as the solvent does not pose a problem of coagulation or the like as a result of a reaction thereof with the above emulsion. More specifically, among various organic solvents described below, any water-soluble organic solvent may be used. According to a further preferred embodiment of the present invention, the water-soluble organic solvent has a boiling point of 180° C. or above.

The first liquid used in the present invention may contain a reactant which, upon contact with the ink composition, forms coagulate. It is considered that the reactant is reacted with the colorant component contained in the ink composition to form coagulate. As described below, according to the present invention, the ink composition also may contain the polymeric fine particles and/or inorganic oxide colloid. According to a preferred embodiment of the present invention, the reactant breaks the state of dissolution and/or dispersion of the polymeric fine particles and the inorganic oxide colloid in the ink composition.

The reactant used in the present invention is not particularly limited so far as the reactant has the above property. Preferred examples of reactants include polyallylamines or derivatives thereof and polyvalent metal salts.

However, when the reactant is added to the first liquid, a combination of the reactant with the polymeric fine particles should be such that coagulation does not occur in the first liquid. In this connection, a combination of a polyallylamine or a derivative thereof with the polymeric fine particles is preferred. The reason for this is probably that, since the polyallylamine or derivative thereof is a cationic polymer which is water soluble and positively charged in water, this compound, when used with the fine particles of the cationic group-containing polymer containing sites possessing ultraviolet absorbing activity and/or photostabilizing activity, causes neither coagulation nor a reaction.

Polyallylamines and polyallylamine derivatives usable as the reactant include, for example, those represented by the following formulae:

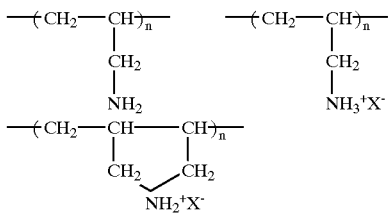

wherein $X^-$ represents chloride, bromide, iodide, nitrate, phosphate, sulfate, acetate or other ions.

In addition, a copolymer of an allylamine with a diallylamine and a copolymer of diallylmethylammmonium chloride with sulfur dioxide may also be used.

The content of the polyallylamine and/or the polyallylamine derivative is preferably 0.5 to 10% by weight based on the ink composition.

The polyvalent metal salt usable in the first liquid is constituted by divalent or higher polyvalent metallic ions and anions bonded to the polyvalent metallic ions and is soluble in water. Specific examples of polyvalent metallic ions include: divalent metallic ions, such as $Ca^{2+}$, $Cu^{2+}$, $Ni^{2+}$, $Mg^{2+}$, $Zn^{2+}$, and $Ba^{2+}$; and trivalent metallic ions, such as $Al^{3+}$, $Fe^{3+}$, and $Cr^{3+}$. Anions include $Cl^-$, $NO_3^-$, $I^-$, $Br^-$, $ClO_3^-$, and $CH_3COO^{31}$.

Especially, a metal salt constituted by $Ca^{2+}$ or $Mg^{2+}$ provides favorable results in terms of pH of the first liquid and the quality of prints.

The concentration of the polyvalent metal salt in the first liquid may be suitably determined so as to attain the effect of providing good print quality and preventing clogging. It, however, is preferably about 0.1 to 40% by weight, more preferably about 5 to 25% by weight.

According to a preferred embodiment of the present invention, the polyvalent metal salt contained in the first liquid is constituted by divalent or higher polyvalent metallic ions and nitrate ions or carboxylate ions bonded to the polyvalent metallic ions and is soluble in water.

In this case, preferably, the carboxylate ions are derived from a saturated aliphatic monocarboxylic acid having 1 to 6 carbon atoms or a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon group in the monocarboxylic acid may be substituted by a hydroxyl group. Preferred examples of such carboxylic acids include lactic acid.

Preferred examples of the carbocyclic monocarboxylic acid having 6 to 10 carbon atoms include benzoic acid and naphthoic acid with benzoic acid being more preferred.

According to a preferred embodiment of the present invention, the first liquid may contain a polyol in addition to the reactant. The polyol has a vapor pressure of not more than 0.01 mmHg at 20° C. The amount of the polyol added is generally not less than 1, preferably 1.0 to 5.0, based on the reactant. Further, according to a preferred embodiment of the present invention, the amount of the polyol added to the first liquid is preferably not less than 10% by weight, more preferably about 10 to 30% by weight.

Specific examples of preferred polyols usable herein include polyhydric alcohols, such as glycerin, diethylene glycol, triethylene glycol, 1,5-pentanediol, and 1,4-butanediol. Further, preferred polyols are, for example, saccharides, such as monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbit, maltose, cellobiose, lactose, sucrose, trehalose, and maltotriose.

These polyols may be added alone or as a mixture of two or more. When a mixture of two or more polyols is added, the amount in total of the polyols added is not less than 1 in terms of weight ratio to the reactant.

According to a preferred embodiment of the present invention, the first liquid contains a wetting agent comprising a high-boiling organic solvent. The high-boiling organic solvent functions to prevent the first liquid from drying out, thereby preventing clogging of the head. Preferred examples of high-boiling organic solvents usable herein, some of which overlap with the above polyols, include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The amount of the high-boiling organic solvent added is not particularly limited. The amount, however, is preferably about 0.5 to 40% by weight, more preferably about 2 to 20% by weight, based on the first liquid.

The first liquid according to the present invention may further contain a penetrating agent. Examples of penetrating agents include: various surfactants, such as cationic surfactants and nonionic surfactants; alcohols, such as methanol, ethanol, and isopropyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

According to a preferred embodiment of the present invention, the first liquid contains a low-boiling organic solvent. Examples of preferred low-boiling organic solvents include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the drying time of printed images produced from the ink composition. The amount of the low-boiling organic solvent added is preferably 0.5 to 10% by weight, more preferably 1.5 to 6% by weight, based on the first liquid.

According to a preferred embodiment of the present invention, the first liquid contains triethanolamine for adjusting pH of the first liquid. The amount of the triethanolamine added is preferably about 0 to 2.0% by weight based on the first liquid.

A colorant described below in connection with the ink composition may be added to the first liquid so that the first liquid serves also as an ink composition.

Among the first liquids, a liquid (a reaction solution) containing the fine particles of a cationic group-containing polymer containing sites possessing ultraviolet-absorbing activity and/or photostabilizing activity and a reactant constitutes another aspect of the present invention (the liquid containing at least the reactant being hereinafter sometimes referred to as "reaction solution"). That is, according to the present invention, there is provided a reaction solution for use in an ink jet recording method comprising the step of depositing a reaction solution, containing a reactant which, upon contact with an ink composition, forms coagulate, and an ink composition onto a recording medium to perform printing. This reaction solution further contains polymeric fine particles having sites possessing ultraviolet absorbing activity and/or photostabilizing activity. The reaction solution according to the present invention is usable in the ink jet recording method according to the present invention, as well as in an ink jet recording method wherein the reaction solution is deposited onto the recording medium only before the deposition of the ink composition.

Second liquid

The second liquid used in the present invention has the same composition as the first liquid, except that the second liquid is free from the polymeric fine particles. More specifically, the second liquid comprises, as an indispensable ingredient, a reactant which, upon contact with the ink composition, forms coagulate, whereas the first liquid comprises, as an indispensable ingredient, the polymeric fine particles. The other ingredients may be the same as those used in the first and second liquids.

Accordingly, the second liquid used in the present invention contains at least a reactant which, upon contact with the ink composition, forms coagulate. Therefore, as described above, the second liquid may be regarded as a reaction solution. Examples of the reactant, the amount of the reactant added, and other conditions may be the same as those described above in connection with the first liquid.

Other ingredients, which may be incorporated into the second liquid, may be the same as those described above in connection with the first liquid. For example, polyols, wetting agents, penetrating agents, low-boiling organic solvents, triethanolamine and/or colorants may be properly selected according to the description in connection with the first liquid. The amount of these ingredients added and other conditions in the second liquid may be properly determined according to the description in connection with the first liquid.

Ink composition

The ink composition used in the present invention comprises at least a colorant and water.

The colorant contained in the ink composition used in the present invention is preferably one which is reacted with the reactant to form coagulate. The colorant may be either a dye or a pigment with the pigment being preferred.

Dyes usable herein include various dyes commonly used in ink jet recording, such as direct dyes, acid dyes, foodstuff dyes, basic dyes, reactive dyes, disperse dyes, vat dyes, soluble vat dyes, and reactive disperse dyes.

Regarding the pigment, inorganic and organic pigments are usable without particular limitation. Examples of inorganic pigments include, in addition to titanium oxide and iron oxide, carbon blacks produced by known processes, such as contact, furnace, and thermal processes. Examples of the organic pigment include azo pigments (including azo lake, insoluble azo pigment, fused azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, the pigment is added, to the ink, as a pigment dispersion prepared by dispersing the pigment in an aqueous medium with the aid of a dispersant or a surfactant. Preferred dispersants are those commonly used in the preparation of pigment dispersions, for example, polymeric dispersants. It would be apparent to a person having ordinary skill in the art that the dispersant and the surfactant contained in the pigment dispersion function also as the dispersant and the surfactant in the ink composition.

The amount of the pigment added to the ink is preferably about 0.5 to 25% by weight, more preferably about 2 to 15% by weight.

According to a preferred embodiment of the present invention, the ink composition contains polymeric fine particles. According to a preferred embodiment of the present invention, the polymeric fine particles are added in the form of a resin emulsion containing water as a continuous phase. Examples of polymeric fine particles usable herein include fine particles of acrylic resin, vinyl acetate resin, styrene-butadiene resin, vinyl chloride resin, acryl-styrene resin, butadiene resin, styrene resin, crosslinked acrylic resin, crosslinked styrene resin, benzoguanamine resin, phenolic resin, silicone resin, and epoxy resin.

According to a preferred embodiment of the present invention, the polymer constituting the polymeric fine particles has a combination of a hydrophilic segment with a hydrophobic segment. The particle diameter of the polymeric fine particles is preferably not more than about 150 nm, more preferably about 5 to 100 nm.

These polymeric fine particles may be generally prepared as a resin emulsion by emulsion polymerization of a monomer in water in the presence of a surfactant and a water-soluble polymerization initiator. For example, an emulsion of an acrylic resin or a styrene-acryl resin may be prepared by emulsion polymerization of a (meth)acrylic ester, or alternatively a (meth)acrylic ester in combination with styrene, in the presence of a surfactant and a water-soluble polymerization initiator.

Conventional resin emulsions may also be used as the above resin emulsion. For example, resin emulsions described in Japanese Patent Publication No. 1426/1987 and Japanese Patent Laid-Open Nos. 56573/1991, 79678/1991, 160068/1991, and 18462/1992 as such may be used as the resin emulsion in the present invention.

Further, commercially available resin emulsions may also be used, and examples thereof include Microgel E-10002 and E-5002 (styrene/acrylic resin emulsion, manufactured by Nippon Paint Co., Ltd.), Voncoat 4001 (acrylic resin emulsion, manufactured by Dainippon Ink and Chemicals, Inc.), Voncoat 5454 (styrene/acrylic resin emulsion, manufactured by Dainippon Ink and Chemicals, Inc.), SAE-1014 (styrene/acrylic resin emulsion, manufactured by Nippon Zeon Co., Ltd.), and Saivinol SK-200 (acrylic resin emulsion, manufactured by Saiden Chemical Industry Co., Ltd).

The amount of the resin emulsion contained in the ink composition used in the present invention is preferably such that the amount of the resin component is in the range of from 0.1 to 40% by weight, more preferably in the range of from 1 to 25% by weight, based on the ink composition.

The resin emulsion has the effect of suppressing the penetration of the colorant component and accelerating the fixation of the colorant component onto the recording medium through interaction between the reaction emulsion and the reactant, particularly a polyvalent metal ion, a polyallylamine, or a polyallylamine derivative. Further, some resin emulsions have the effect of forming a film on the recording medium to improve the rubbing/scratch resistance of prints.

The ink composition used in the present invention may contain an inorganic oxide colloid. Examples of preferred inorganic oxide colloids usable herein include colloidal silica and alumina colloid. These are generally in the form of a colloidal solution of ultrafine particles of $SiO_2$, $Al_2O_3$ or the like dispersed in water or an organic solvent. Commercially available inorganic oxide colloids are generally such that the dispersion medium is water, methanol, 2-propanol, n-propanol, xylene or the like and the diameter of $SiO_2$, $Al_2O_3$ and other particles is 5 to 100 nm. Further, pH of the colloidal solutions of inorganic oxide is, in many cases, adjusted to the acidic or alkaline side rather than the neutral region. This is because the stable dispersion region of the inorganic oxide colloid is present on the acidic side or the alkaline side. In adding the colloidal solution to the ink composition, pH of the stable dispersion region of the inorganic oxide colloid and pH of the ink should be taken into consideration.

The amount of the inorganic oxide colloid added to the ink composition is preferably 0.1 to 15% by weight, and the addition of two or more inorganic oxide colloids is also possible.

According to a preferred embodiment of the present invention, the ink composition comprises an organic solvent. The organic solvent is preferably a low-boiling organic solvent. Examples of preferred low-boiling organic solvents include methanol, ethanol, n-propyl alcohol, isopropyl alcohol, n-butanol, sec-butanol, tert-butanol, iso-butanol, and n-pentanol. Monohydric alcohols are particularly preferred. The low-boiling organic solvent has the effect of shortening the drying time of the ink.

According to the preferred embodiment of the present invention, the ink composition used in the present invention further comprises a high-boiling organic solvent as a wetting agent. Preferred examples of high-boiling organic solvents usable herein include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The amount of the wetting agent added is preferably in the range of about 0.5 to 40% by weight, more preferably 2 to 20% by weight, based on the ink composition. The amount of the low-boiling organic solvent added is preferably in the range of about 0.5 to 10% by weight, more preferably 1.5 to 6% by weight, based on the ink composition.

According to a preferred embodiment of the present invention, the ink composition contains a saccharide. Examples of saccharides include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbit, maltose, cellobiose, lactose, sucrose, trehalose, and maltotriose. The polysaccharides refer to saccharides in a wide sense and embrace materials which widely exist in the natural world, such as alginic acid, α-cyclodextrin, and cellulose.

Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbit.

The ink composition according to the present invention may further comprise a surfactant. Examples of surfactants usable herein include anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides), and acetylene glycol (OLFINE Y and Surfynol 82, 104, 465, and 485 (all the above products being manufactured by Air Products and Chemicals Inc.). They may be used alone or in combination of two or more.

The content of the saccharide is generally 0.1 to 40% by weight, preferably 0.5 to 30% by weight, based on the ink composition.

If necessary, pH adjusters, preservatives, antimolds and the like may be added to the ink composition.

Ink jet recording head and ink jet recording apparatus

The ink jet recording head according to the present invention is reciprocated above a recording medium to deposit an ink composition and a first liquid, containing at least polymeric fine particles, onto the recording medium, wherein the recording head has, in addition to nozzles for ejecting the ink composition, nozzles for ejecting at least the first liquid.

The ink jet recording apparatus according to the present invention is provided with the above recording head.

The ink jet recording head and the ink jet recording apparatus for carrying out the ink jet recording method according to the present invention will be described with reference to the accompanying drawings.

FIG. 1 is a diagram showing an embodiment of an ink jet recording apparatus. In this embodiment, an ink composition and a first liquid are stored in a tank and fed into a recording head through an ink tube. Specifically, a recording head 1 is communicated with an ink tank 2 through an ink tube 3. In this case, the interior of the ink tank 2 is partitioned, and a chamber for an ink composition, optionally a plurality of chambers respectively for a plurality of color ink compositions, and a chamber for the first liquid are provided.

The recording head 1 is moved along a carriage 4 by means of a timing belt 6 driven by a motor 5. On the other hand, paper 7 as a recording medium is placed by a platen 8 and a guide 9 at a position facing the recording head 1. In this embodiment, a cap 10 is provided. A suction pump 11 is connected to the cap 10 in order to conduct the so-called "cleaning operation." The sucked ink composition is resorvoired in a waste ink tank 13 through a tube 12.

Figure 2:
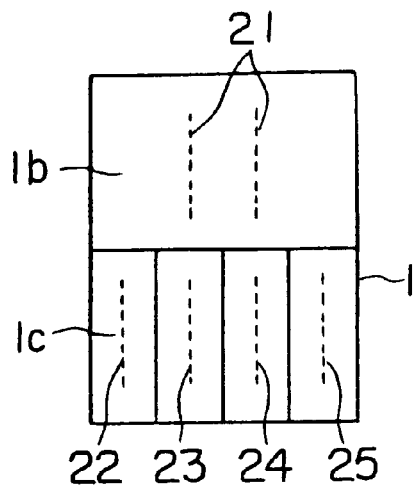
FIG. 2 is an enlarged view of a nozzle face in a recording head, wherein reference character 1*b* designates a nozzle face for a first liquid and reference character 1*c* a nozzle face for ink compositions.

FIG. 2 is an enlarged view showing the surface of nozzles for the recording head 1. In the drawing, a nozzle face for the first liquid is indicated by 1b. Nozzles 21 for ejecting the first liquid are arranged in the longitudinal direction. On the other hand, a reference character 1c designates a nozzle face for the ink composition, and a yellow ink composition, a magenta ink composition, a cyan ink composition, and a black ink composition are ejected respectively through nozzles 22, 20 23, 24 and 25.

Figure 3:
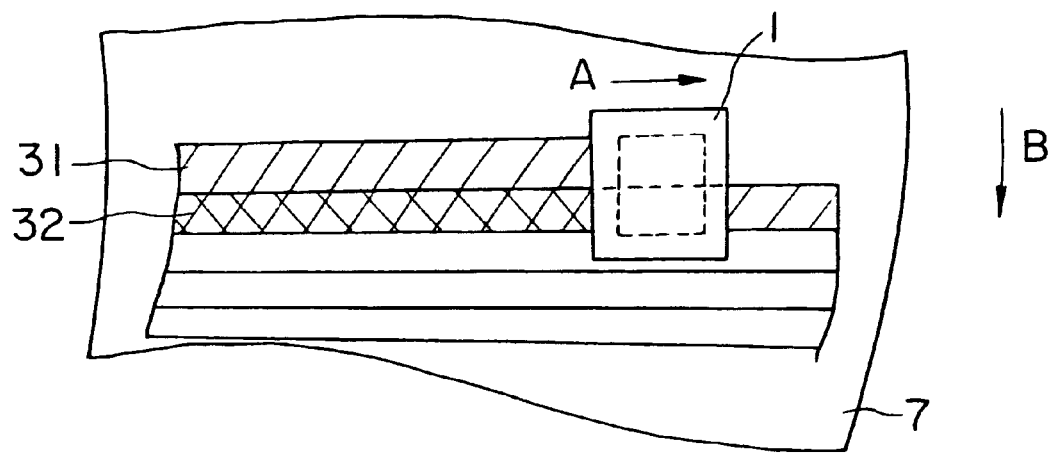
FIG. 3 is a diagram illustrating an ink jet recording method using the recording head shown in FIG. 2, wherein numeral 31 designates a region where a first liquid has been deposited and numeral 32*a* printed region where an ink composition has been printed on the deposited first liquid.

An ink jet recording method using the recording head shown in FIG. 2 will be described with reference to FIG. 3. The recording head 1 is moved in the direction indicated by an arrow A. During the movement, the first liquid is ejected through the nozzle face 1b to form a first liquid-deposited region 31 in a band form on the recording medium 7. Subsequently, the recording medium 7 is transferred by a predetermined extent in the paper feed direction indicated by an arrow B, during which time the recording head 1 is moved in the direction opposite to that indicated by the arrow A in the drawing and returned to the left end of the recording medium 7, and the recording head 1 conducts printing using the ink composition on the first liquid-deposited region, thereby forming a print region 32.

Figure 4:
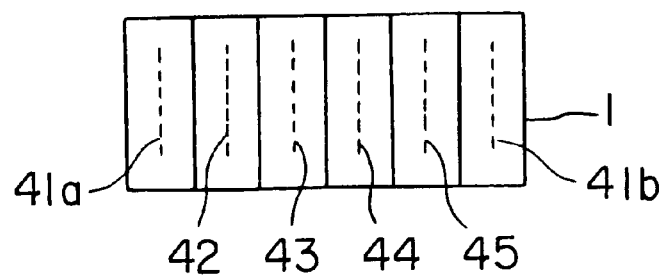
FIG. 4 is a diagram showing another embodiment of the recording head preferably usable in practicing the ink jet recording method according to the present invention, wherein all ejection nozzles are arranged in the lateral direction.

Further, as shown in FIG. 4, in the recording head 1, it is also possible to arrange all nozzles in the lateral direction to construct a nozzle assembly. In the drawing, ejection nozzles for a first liquid are denoted by 41a and 41b, and a yellow ink composition, a magenta ink composition, a cyan ink composition, and a black ink composition are ejected respectively through nozzles 42, 43, 44 and 45. In the recording head according to this embodiment, the recording head 1, when reciprocated on the carriage, can conduct printing during both the movement of the recording head 1 on the carriage in the forward direction and the movement of the recording head 1 on the carriage in the backward direction. Therefore, in this case, printing at a higher speed is expected as compared with the case where the recording head shown in FIG. 2 is used.

The use of only one ejection nozzle for the first liquid suffices for desired results (for example, the nozzle indicated by numeral 41b in the drawing may be omitted). This can leads to a further reduction in size of head and an increase in printing speed. In this embodiment, the printing is carried out during either the movement of the recording head 1 on the carriage in the forward direction or the movement of the recording head 1 on the carriage in the backward direction.

Figure 5:
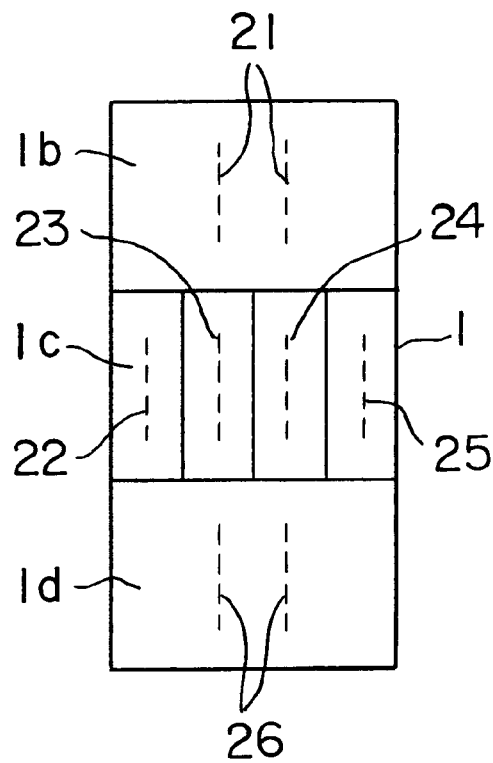
FIG. 5 is an enlarged view of a nozzle face in a recording head in an embodiment using the first liquid according to the present invention, wherein reference character 1*b* designates a nozzle face for the second liquid, reference character ic a nozzle face for the ink composition, and reference character 1*d* a nozzle face for the first liquid.

FIG. 5 is an enlarged view of a nozzle face of a recording head 1 according to another preferred embodiment of the present invention, that is, a recording head using the first liquid. A nozzle face for the second liquid, which forms coagulate upon contact with the ink composition, is denoted by 1b. Nozzles 21 for ejecting the second liquid are arranged in the longitudinal direction. Instead of the second liquid, the first liquid may be ejected through the portion denoted by 1b. A nozzle face for the ink composition is denoted by 1c, and a yellow ink composition, a magenta ink composition, a cyan ink composition, and a black ink composition are ejected respectively through nozzles 22, 23, 24 and 25. A nozzle face for the first liquid is to the present invention is expected as compared with the case where the recording head shown in FIG. 5 is used.

Regulating the surface tension of the second liquid and/or the first liquid and the ink composition enables high-quality prints to be more stably provided. In this case, the use of only one ejection nozzle for each of the second liquid and the first liquid suffices for desired results (for example, the nozzles indicated by 41b and/or 40b in the drawing may be omitted). This can leads to a further reduction in size of head and an increase in printing speed. In this embodiment, the printing is carried out during either the movement of the recording head 1 on the carriage in the forward direction or the movement of the recording head 1 on the carriage in the backward direction.

In the ink jet recording apparatus, the supplement of the ink composition may be carried out by replacing a cartridge as the ink tank. The ink tank may be integral with the recording head.

Figure 7:
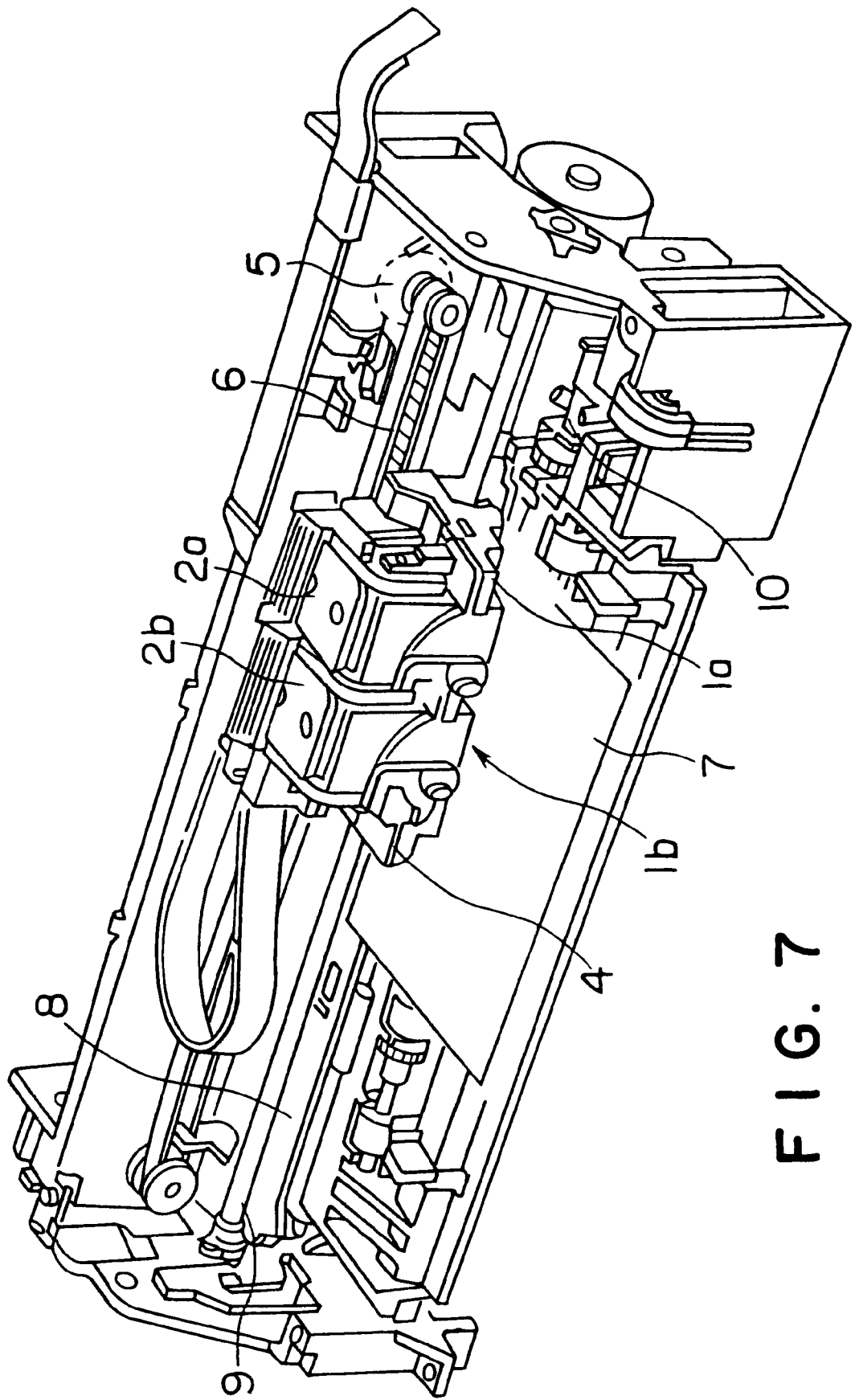
FIG. 7 is a diagram showing an ink jet recording apparatus preferably usable in practicing the ink jet recording method according to the present invention, wherein a recording head is integral with an ink tank.

A preferred embodiment of an ink jet recording apparatus using this ink tank is shown in FIG. 7. In the drawing, the same members as used in the apparatus shown in FIG. 1 have the same reference numerals. In the embodiment shown in FIG. 7, recording heads 1a and 1b are integral respectively with ink tanks 2a and 2b. The recording head 1a ejects the ink composition while the recording head 1b ejects the second liquid. Alternatively, the recording head 1b may eject the ink composition while the recording head 1a may eject the second liquid. According to another embodiment of the present invention, the recording head 1a and the recording head 1b eject the ink composition and the first liquid, respectively, or vice versa. If necessary, a third recording head may be additionally provided. In this case, the first recording head ejects one of the second liquid, the ink composition, and the third liquid, the second recording head ejects one of the remaining two, and the third recording head ejects the remaining one. Basically, the printing may be carried out as described above in connection with the apparatus shown in FIG. 1. According to this embodiment, the recording head 1a, together with the ink tank 2a, is moved on the carriage 4, while the recording head 1b, together with the ink tank 2b, is moved on the carriage 4.

Figure 8:
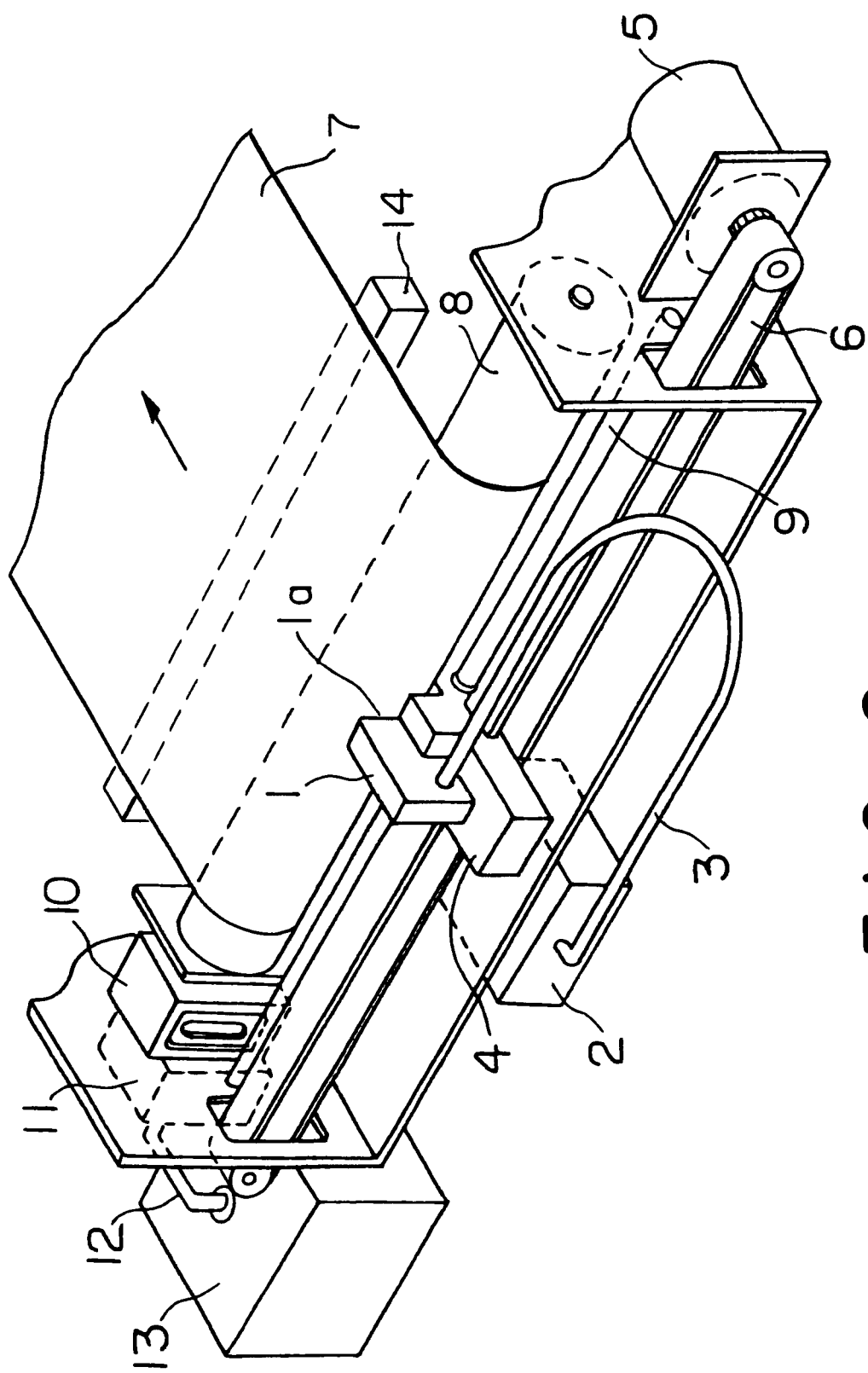
FIG. 8 is a diagram showing an ink jet recording apparatus preferably usable in practicing the ink jet recording method according to the present invention, wherein a heater is comprised to heat a recording medium after printing.

A preferred embodiment of an ink jet recording apparatus provided with a heater for heating the printed recording medium is shown in FIG. 8. The recording apparatus shown in FIG. 8 is the same as that shown in FIG. 1, except that a heater 14 is additionally provided. The heater 14 may be of a contact type wherein, in heating the recording medium, it is brought into contact with the recording medium. Alternatively, the heater 14 may be of a non-contact type where the recording medium is heated by applying infrared rays or the like or blowing hot air to the recording medium.

EXAMPLES

The following examples further illustrate the present invention, but are not intended to limit it.

Example A

Resin emulsion 1

RUVA-93 (2-(2'-hydroxy-5-methylacryloxyethylphenyl)-2H-benzotriazole) (20 parts by weight), lauryltrimethylammonium chloride (5 parts by weight), dimethylaminoethyl methacrylate methylchloride (30 parts by weight), butyl acrylate (50 parts by weight), ion-exchanged water (150 parts by weight), and a polymerization initiator V-50 (manufactured by Wako Pure Chemical Industries, Ltd.) (0.2 part by weight) were allowed to react under $N_2$ gas at 60° C. with stirring. After the completion of the reaction, the system was cooled to 30° C. to terminate the polymerization.

| Reaction solution A1 | |
|---|---|
| Polyallylamine | 3 wt % |
| Triethylene glycol monobutyl ether | 10 wt % |
| Glycerin | 15 wt % |
| Resin emulsion 1 | 5 wt % |
| Ion-exchanged water | Balance |
| Reaction solution A2 | |
| Polyallylamine | 3 wt % |
| Triethylene glycol monobutyl ether | 10 wt % |
| Glycerin | 20 wt % |
| Ion-exchanged water | Balance |

The above ingredients were mixed together to prepare a second liquid.

| Ink 1 | |
|---|---|
| C.I. Pigment Yellow 93 | 5 wt % |
| Liquid medium: | |
| Styrene/acryl copolymer ammonium salt (dispersant: molecular weight 7000) | 1.5 wt % |
| Voncoat 4001 (acrylic resin emulsion, resin component 50%; manufactured by Dainippon Ink and Chemicals, Inc.) | 5 wt % |
| Snowtex S (colloidal silica, $SiO_2$ content 20 wt %, manufactured by Nissan Chemical Industry Ltd.) | 1.5 wt % |
| Glycerin | 10 wt % |
| 2-Pyrrolidone | 2 wt % |
| Ion-exchanged water | Balance |

The colorant ingredient, together with the dispersant ingredient, was dispersed, and the other ingredients were then added to and mixed therewith. Insolubles having a given or larger size were removed by filtration to prepare an ink composition.

| Ink 2 | |
|---|---|
| C.I. Pigment Yellow 93 | 5 wt % |
| Liquid medium: | |
| Styrene/acryl copolymer ammonium salt (dispersant: molecular weight 7000) | 1.5 wt % |
| Voncoat 5454 (styrene-acrylic resin emulsion, resin component 45%; manufactured by Dainippon Ink and Chemicals, Inc.) | 5 wt % |
| Snowtex S (colloidal silica, $SiO_2$ content 20 wt %, manufactured by Nissan Chemical Industry Ltd.) | 1.5 wt % |
| Maltitol | 3.5 wt % |
| 2-Pyrrolidone | 2 wt % |
| Ion-exchanged water | Balance |

Evaluation test

Evaluation 1: Lightfastness

For each of yellow inks 1 and 2, a blotted image of 3 cm×3 cm was printed (100% duty) on plain papers, i.e., Xerox 4024 and Xerox P, and a specialty paper (Superfine) for ink jet recording (manufactured by Seiko Epson Corporation) by means of an ink jet printer MJ 8000C (manufactured by Seiko Epson Corporation).

The blotted images thus obtained were subjected to a 600-hr exposure test using a xenon fadeometer. In this case, for the blotted image area, the color before exposure and the color after exposure were measured with a Macbeth CE-7000 spectrophotometer (manufactured by Macbeth) and expressed in terms of the L*a*b* color system of the color difference indication method specified in CIE (Commission International de l'Eclairage), and a change in color between before the exposure and after the exposure in the blotted image area was expressed in terms of the color difference determined by the following equation.

Color difference:

$$\Delta E^*_{ab} = [(\Delta L^*)^2 + (\Delta a^*)^2 + (\Delta b^*)^2]^{1/2}$$

The results were evaluated according to the following criteria. In this evaluation, the average of color difference values for the three papers was used.

A: $\Delta E^*_{ab} \leq 10$

B: $10 < \Delta E^*_{ab} \leq 20$

C: $\Delta E^*_{ab} > 20$

Further, for the blotted image area, the color denoted by 1d. Nozzles 26 for ejecting the first liquid is provided in the longitudinal direction. Specifically, in performing printing by means of this recording head, the nozzles for the first liquid are preferably disposed in the backmost row relative to the printing direction.

When there is no need to use the second liquid before the application of the ink composition, the portion denoted by 1b (that is, the portion where the nozzles for the second liquid are provided) in the recording head shown in FIG. 5 may be omitted.

Figure 6:
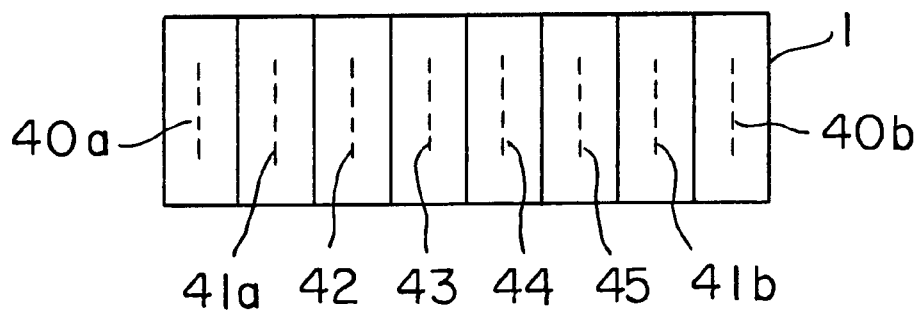
FIG. 6 is a diagram showing another embodiment of the recording head preferably usable in practicing the ink jet recording method using the first liquid according to the present invention, wherein all ejection nozzles are arranged in the lateral direction.

As with the recording head 1 according to the embodiment shown in FIG. 4, for the recording head 1 according to the embodiment using the first liquid, all the nozzles may be arranged in the lateral direction. This recording head is shown in FIG. 6. In the drawing, ejection nozzles for the second liquid are denoted by 41a and 41b, and a yellow ink composition, a magenta ink composition, a cyan ink composition, and a black ink composition are ejected respectively through nozzles 42, 43, 44 and 45. Nozzles 40a and 40b located at both ends are ejection nozzles for the first liquid. As shown in FIG. 6, preferably, the nozzles for ejecting the first liquid and/or the second liquid are symmetrically disposed at both ends, and the nozzles for ejecting the ink compositions are sandwiched between these nozzles. In the recording head according to the embodiment shown in FIG. 6, the nozzles for the first liquid provided at both ends of the nozzle array disposed in the printing direction are preferably controlled so that, in the printing, only the nozzles located at the backmost row in the printing direction are operated. In this operation, the printing can be performed during both the movement of the recording head 1 on the carriage in the forward direction and the movement of the recording head 1 on the carriage in the backward direction, and the first liquid is deposited last of all. Therefore, in this case, ink jet recording at a higher speed according density before the exposure and the color density after the exposure were measured with a Macbeth densitometer TR927 (manufactured by Macbeth), and a change in color density between before and after the exposure in the blotted image area was determined. The results were evaluated according to the following criteria.

A: OD value change of not more than 5%

B: OD value change of more than 5 to less than 10%

C: OD value change of not less than 10%

The evaluation results were as follows.

TABLE 1

| | Reaction solution | Ink | Lightfastness Color difference between before exposure and after exposure | Difference in OD value between before exposure and after exposure |
|---|---|---|---|---|
| Ex. A1 | Reaction solution A1 | Ink 1 | A | A |
| Ex. A2 | Reaction solution A1 | Ink 2 | A | A |
| Comp. Ex. A1 | Reaction solution A2 | Ink 1 | C | C |
| Comp. Ex. A2 | Reaction solution A2 | Ink 2 | C | C |

Example B

A resin emulsion and an ink composition were prepared in the same manner as in Example A.

Resin emulsion 2

A resin emulsion 2 was prepared in the same manner as used in the preparation of the resin emulsion 1, except that dimethylaminoethyl methacrylate methylchloride in the resin emulsion 1 in Example A was changed to dimethylaminoethyl methacrylate benzylchloride.

The resin emulsion 2 thus prepared had a minimum film-forming temperature of about −10° C.

Resin emulsion 3

RUVA-93 (2-(2'-hydroxy-5-methylacryloxyethylphenyl)-2H-benzotriazole) (10 parts by weight), lauryltrimethylammonium chloride (2.5 parts by weight), dimethylaminoethyl methacrylate benzylchloride (15 parts), butyl acrylate (25 parts by weight), isobornyl methacrylate (100 parts by weight), ion-exchanged water (150 parts by weight), and a polymerization initiator V-50 (manufactured by Wako Pure Chemical Industries, Ltd.) (0.3 part by weight) were allowed to react under $N_2$ gas at 60° C. with stirring. After the completion of the reaction, the system was cooled to 300° C. to terminate the polymerization.

The resin emulsion 3 thus prepared had a minimum film-forming temperature of about 82° C.

Reaction solution B1: (First liquid: resin emulsion+ reactant)

The reaction solution B1 was the same manner as the reaction solution A1, except that the resin emulsion 2 was used instead of the resin emulsion 1. That is, the reaction solution B1 contains both the reactant and the resin emulsion (minimum film-forming temperature: about −10° C.). In the table showing the evaluation results, the reaction solution B1 is abbreviated to "B1."

Reaction solution B2: (Second liquid: reactant alone)

The reaction solution B2 was the same as the reaction solution A2. That is, the reaction solution B2 contains the reactant alone and is free from the resin emulsion.

Reaction solution B3: (First liquid: resin emulsion alone)

The reaction solution B3 was the same as the reaction solution A1, except that magnesium nitrate was removed from the reaction solution A1. That is, the reaction solution B3 contains the resin emulsion alone and is free from the reactant.

Reaction solution B4: (First liquid: resin emulsion+ reactant)

The reaction solution B4 was the same as the reaction solution B1, except that the resin emulsion 3 was used instead of the resin emulsion 1. That is, the reaction solution B4 contains both the reactant and the resin emulsion (minimum film-forming temperature: about 82° C.).

| Ink 3 | |
|---|---|
| C.I. Pigment Yellow 93 | 5 wt % |
| Liquid medium: | |
| Styrene/acryl copolymer ammonium salt (dispersant: molecular weight 7000) | 1.5 wt % |
| Voncoat 4001 (acrylic resin emulsion, resin component 50%; manufactured by Dainippon Ink and Chemicals, Inc.) | 5 wt % |
| Snowtex S (colloidal silica, $SiO_2$ content 20 wt %, manufactured by Nissan Chemical Industry Ltd.) | 1.5 wt % |
| Glycerin | 10 wt % |
| 2-Pyrrolidone | 2 wt % |
| Ion-exchanged water | Balance |
| Ink 4 | |
| C.I. Direct Black 154 | 3.5 wt % |
| Liquid medium: | |
| Glycerin | 10 wt % |
| Diethylene glycol | 2 wt % |
| 2-Pyrrolidone | 2 wt % |
| Ion-exchanged water | Balance |

The ink 4 was different from the inks 1 to 3 in that a dye was used in the ink 4.

Print evaluation test

An ink jet recording apparatus was provided to perform printing on the following various papers. At that time, the reaction solution was ejected through nozzles located at both ends, and the ink was ejected through nozzles other than the nozzles located at both the ends. The printing was performed in various orders of the printing of the reaction solution and the printing of the ink. The order of printing adopted was as summarized in the table below showing the test results. For both the reaction solution and the ink, the ink weight was 0.07 μg/dot, and the density was 360 dpi. Under these conditions, alphabetical letters were printed.

Papers used for evaluation (1) Xerox P (Xerox Corp.)
(2) Ricopy 6200 (Ricoh Co. Ltd.)
(3) Xerox 4024 3R 721 (Xerox Corp.)
(4) Neenah Bond (Kimberly-Clark)
(5) Xerox R (Xerox Corp.)
(6) Yamayuri (Honshu Paper Co., Ltd.)

Evaluation 1: Print quality (feathering)

Prints thus obtained were examined for feathering in letters after drying, and the results were evaluated according to the following criteria.

A: For all the papers, sharp characters were yielded without feathering.

B: For some of the papers, slight feathering was observed.

C: For all the papers, slight feathering was observed.

D: For all the papers, considerable feathering was observed.

Evaluation 2: Rubbing/scratch resistance

Wetted Bemcot was fixed onto the tip of a yellow, water-base fluorescent marker pen [ZEBRA PEN (trademark)] manufactured by ZEBRA, and the characters in the print were then rubbed therewith at a marking force of $4.9 \times 10^5$ N/m$^2$ and visually inspected for staining of the yellow portion. The results were evaluated according to the following criteria.

A: Rubbing twice immediately after the printing caused no stain.

B: Rubbing twice 24 hr after air drying caused no stain.

Results of evaluation tests

The results of evaluation were as summarized in the following items (1) to (3).

In the table showing the results of evaluation, for example, "B1→I3→B3" in the column of the order of printing means that the treating agents and the ink were deposited onto the recording medium in its printing position in the order of the reaction solution B1 (first), the ink 3 (second), and the reaction solution B3 (finally).

(1) A pigment was used as the colorant in the ink, and printing was performed by means of a conventional ink jet recording apparatus (not provided with heating means). The results are shown in Table 2.

TABLE 2

|  | Order of printing | Print quality | Rubbing/scratch resistance | Lightfastness | | Gloss |
|---|---|---|---|---|---|---|
|  |  |  |  | Color difference | Difference in OD value |  |
| Ex. B1 | I3 → B1 | A | A | A | A | A |
| Ex. B2 | I3 → B3 | B | A | A | A | A |
| Ex. B3 | B1 → I3 → B1 | A | A | A | A | A |
| Ex. B4 | B1 → I3 → B3 | A | A | A | A | A |
| Ex. B5 | B2 → I3 → B1 | A | A | A | A | A |
| Ex. B6 | B2 → I3 → B3 | A | A | A | A | A |
| Comp. Ex. B1 | I3 → B2 | A | B | C | C | C |
| Comp. Ex. B2 | B1 → I3 → B2 | A | B | A | A | B |
| Comp. Ex. B3 | B2 → I3 → B2 | A | B | C | C | C |
| Comp. Ex. B4 | B3 → I3 → B2 | A | B | A | A | B |

C: For some of the papers, rubbing twice 24 hr after air drying caused stain although rubbing once 24 hr after air drying caused no stain.

D: For some of the papers, rubbing once 24 hr after air drying caused stain.

Evaluation 3: Lightfastness

The lightfastness was evaluated in the same manner as described above in connection with the evaluation 1 (lightfastness) in Example A.

Evaluation 4: Gloss

The prints after drying were inspected for gloss of the characters. The results were evaluated according to the following criteria.

A: A considerably higher level of gloss was provided as compared with the prints using the ink alone.

B: A somewhat higher level of gloss was provided as compared with the prints using the ink alone.

C: The gloss was substantially the same as that in the prints using the ink alone.

Evaluation 5: Waterfastness

Water droplets were dropped onto characters in the prints after drying, and the state of the sample after air drying was visually inspected. The results were evaluated according to the following criteria.

A: The state remained unchanged from the initial state.

B: The characters were highly legible, although the dye was slightly eluted.

C: The characters were legible, although feathering was observed.

D: The characters were blurred, and illegible.

(2) A dye was used as the colorant in the ink, and printing was performed by means of a conventional ink jet recording apparatus (not provided with heating means). The results are shown in Table 3.

TABLE 3

|  | Order of printing | Print quality | Waterfastness | Gloss |
|---|---|---|---|---|
| Ex. B7 | I4→B1 | A | B | A |
| Ex. B8 | I4→B3 | B | B | A |
| Ex. B9 | B1→I4→B1 | A | B | A |
| Ex. B10 | B1→I4→B3 | A | B | A |
| Ex. B11 | B2→I4→B1 | A | B | A |
| Ex. B12 | B2→I4→B3 | A | B | A |
| Comp. Ex. B5 | I4→B2 | A | C | C |
| Comp. Ex. B6 | B1→I4→B2 | A | C | B |
| Comp. Ex. B7 | B2→I4→B2 | A | C | C |
| Comp. Ex. B8 | B3→I4→B2 | A | C | B |

(3) A pigment was used as the colorant in the ink, and printing was performed by means of an ink jet recording apparatus provided with heating means (that is, using resin emulsion 3). The results are shown in Table 4.

TABLE 4

|  | Order of printing | Heater | Print quality | Rubbing/scratch resistance | Lightfastness | | Gloss |
|---|---|---|---|---|---|---|---|
|  |  |  |  |  | Color difference | Difference in OD value |  |
| Ex. B13 | I3 → B4 | ON | A | A | A | A | A |
| Ex. B14 | B4 → I3 → B4 | ON | A | A | A | A | A |
| Ex. B15 | B2 → I3 → B4 | ON | A | A | A | A | A |
| Comp. Ex. B9 | I3 → B4 | OFF | A | B | A | A | B |
| Comp. Ex. B10 | B4 → I3 → B4 | OFF | A | B | A | A | B |
| Comp. Ex. B11 | B2 → I3 → B4 | OFF | A | B | A | A | B |

What is claimed is:

1. An ink jet recording method for recording with an ink composition, a first liquid containing at least polymeric fine particles and a second liquid containing a reactant which, upon contact with the ink composition, forms coagulate, said method comprising the steps of:
   (a) depositing the second liquid onto a recording medium;
   (b) depositing the ink composition onto the recording medium in a position where the second liquid has been deposited; and
   (c) depositing the first liquid onto the recording medium in said position.

2. The ink jet recording method according to claim 1, wherein the deposition of the ink composition and the first liquid onto the recording medium is carried out by means of an ink jet recording head, which is reciprocated above the recording medium, and the ink composition and the first liquid are deposited during either the movement of the ink jet recording head in the forward or backward direction.

3. The ink jet recording method according to claim 1, wherein the deposition of the ink composition and the first liquid onto the recording medium is carried out by means of an ink jet recording head, which is reciprocated above the recording medium, and the ink composition and the first liquid are deposited during both the movement of the ink jet recording head in the forward and backward directions.

4. The ink jet recording method according to claims 1, wherein the first liquid further contains a reactant which, upon contact with the ink composition, forms coagulate.

5. The ink jet recording method according to claims 1, which further comprises, before the deposition of the ink composition onto the recording medium, the step of depositing the first liquid containing at least the polymeric fine particles onto the recording medium.

6. The ink jet recording method according to claims 1, which further comprises, before the deposition of the ink composition onto the recording medium, the step of depositing the first liquid onto the recording medium, the first liquid containing at least polymeric fine particles and, in addition, a reactant which, upon contact with the ink composition, forms coagulate.

7. The ink jet recording method according to claims 1, wherein the polymeric fine particles have a film-forming property.

8. The ink jet recording method according to claim 7, wherein the polymeric fine particles have a minimum film-forming temperature of 150° C. or below.

9. The ink jet recording method according to claim 7, wherein the polymeric fine particles have a minimum film-forming temperature of 30° C. or below.

10. The ink jet recording method according to claim 8, which further comprises, after the deposition of the first liquid onto the recording medium, the step of heating the recording medium to the minimum film-forming temperature or above.

11. The ink jet recording method according to claim 1, wherein the polymeric fine particles have sites possessing ultraviolet absorbing activity and/or photostabilizing activity.

12. The ink jet recording method according to claim 11, wherein the site possessing ultraviolet absorbing activity and/or photostabilizing activity is selected from the group consisting of aromatic monocyclic hydrocarbon, fused polycyclic aromatic hydrocarbon, heteromonocyclic, and fused heterocyclic groups.

13. The ink jet recording method according to claim 11, wherein the site possessing ultraviolet absorbing activity and/or photostabilizing activity is selected from the group consisting of a benzophenone, benzotriazole, hindered phenol, salicylate, cyanoacrylate, and hindered amine skeleton.

14. The ink jet recording method according to claim 11, wherein the polymeric fine particles have cationic groups.

15. The ink jet recording method according to claim 1, wherein the polymeric fine particles is used in the form of a resin emulsion containing water as a continuous phase.

16. The ink jet recording method according to claim 1, wherein the first liquid comprises water and a water-soluble organic solvent.

17. The ink jet recording method according to claim 16, wherein the water-soluble organic solvent has a boiling point of 180° C. or above.

18. The ink jet recording method according to claim 1, wherein the ink composition comprises at least a colorant, water, and a water-soluble organic solvent.

19. The ink composition according to claim 18, wherein the colorant in the ink composition is a pigment or a dye.

20. The ink jet recording method according to claim 1, wherein the ink composition contains polymeric fine particles and/or an inorganic oxide colloid.

21. A record printed by the ink jet recording method according to claim 1.

22. An ink jet recording head for carrying out the ink jet recording method according to claim 1, said ink jet recording head comprising nozzles for ejecting the ink composition, nozzles for ejecting the first liquid and nozzles for ejecting the second liquid.

23. The ink jet recording head according to claim 22, which further comprises nozzles for ejecting the first liquid containing polymeric fine particles and, in addition, a reactant which, upon contact with the ink composition, forms coagulate.

24. The ink jet recording head according to claim 22, wherein the nozzles for ejecting the ink composition and the nozzles for ejecting the first liquid are disposed in that order in the direction of the movement of the recording head.

25. The ink jet recording head according to claim 22, wherein the nozzles are placed side by side at a right angle to the direction of the movement of the recording head and the nozzles located at both ends are those for ejecting the first liquid.

26. An ink jet recording apparatus for depositing an ink composition and a first liquid containing at least polymeric fine particles onto a recording medium to perform printing, said ink jet recording apparatus comprising the ink jet recording head according to claim 23.

27. The ink jet recording apparatus according to claim 26, which further comprises means for heating the recording medium after the deposition of the first liquid onto the recording medium.

28. A reaction solution for use in an ink jet recording method comprising the step of despositing a reaction solution, containing a reactant which, upon contact with an ink composition, forms coagulate, and ink composition onto a recording medium to perform printing, the reaction solution containing polymeric fine particles having a site possessing ultraviolet absorbing activity and/or photostabilizing activity, wherein the site possessing ultraviolet absorbing activity and/or photostabilizing activity is selected from the group consisting of aromatic monocyclic hydrocarbon, fused polycyclic aromatic hydrocarbon, heteromonocyclic and fused heterocyclic groups.

29. The reaction solution according to claim 28, wherein the site possessing ultraviolet absorbing activity and/or photostabilizing activity is selected from the group consisting of a benzophenone, benzotriazole, hindered phenol, salicylate, cyanoacrylate, and hindered amine skeleton.

30. The reaction solution according to claim 28, wherein the polymeric fine particles have cationic groups.

31. The reaction solution according to claim 28, wherein the polymeric fine particles are added in the form of a resin emulsion containing water as a continuous phase.

32. The reaction solution according to claim 29, wherein the reactant contained in the reaction solution is a polyvalent metal salt or a polyallylamine or a derivative thereof.

33. A set comprising a reaction solution according to claim 28 and an ink composition containing a colorant, water, and a water-soluble organic solvent.

34. The set according to claim 33, wherein the colorant in the ink composition is a pigment or a dye.

35. The set according to claim 33, wherein the ink composition contains polymeric fine particles, an inorganic oxide colloid or both.

36. The set according to claim 33, wherein the polymeric fine particles are in the form of a resin emulsion containing water as a continuous phase.

* * * * *